US012065331B2

(12) United States Patent
Drouet

(10) Patent No.: US 12,065,331 B2
(45) Date of Patent: Aug. 20, 2024

(54) BRAKE SYSTEM FOR AN ELEVATOR

(71) Applicant: Inventio AG, Hergiswil (CH)

(72) Inventor: Catherine Drouet, Bulle (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/551,890

(22) PCT Filed: Mar. 4, 2022

(86) PCT No.: PCT/EP2022/055520
§ 371 (c)(1),
(2) Date: Sep. 22, 2023

(87) PCT Pub. No.: WO2022/207232
PCT Pub. Date: Oct. 6, 2022

(65) Prior Publication Data

US 2024/0174488 A1 May 30, 2024

(30) Foreign Application Priority Data

Mar. 31, 2021 (EP) .................................... 21166445

(51) Int. Cl.
*B66B 5/18* (2006.01)
*B66B 1/36* (2006.01)

(52) U.S. Cl.
CPC . *B66B 5/18* (2013.01); *B66B 1/36* (2013.01)

(58) Field of Classification Search
CPC .................................. B66B 1/32; B66B 5/18
See application file for complete search history.

(56) References Cited

U.S. PATENT DOCUMENTS

| | | | | |
|---|---|---|---|---|
| 3,583,500 A * | 6/1971 | Randall | F15B 11/032 175/38 |
| 3,654,837 A * | 4/1972 | Knapp | F15B 11/02 137/503 |
| 4,031,987 A * | 6/1977 | Webb | F16D 65/46 188/75 |
| 4,033,434 A * | 7/1977 | Henrich | F16D 59/02 188/196 B |

(Continued)

FOREIGN PATENT DOCUMENTS

| | | |
|---|---|---|
| CN | 106163959 A | 11/2016 |
| DE | 202011051664 U1 | 3/2012 |

(Continued)

*Primary Examiner* — Michael A Riegelman
(74) *Attorney, Agent, or Firm* — William J. Clemens; Shumaker, Loop & Kendrick, LLP

(57) ABSTRACT

A brake system for an elevator system includes a first brake circuit, a second brake circuit and a control unit, the first and second brake circuits each having a brake, and each brake including an actuator and a main spring unit, the actuator being preloaded by the main spring unit in the closing direction of the brake with the force required for applying the braking force. The actuator is activated by a control signal of the control unit to compensate the force of the main spring unit, and thus release the brake. The control unit, upon activation, selects only one of the two control signals between the activation of the first and second brake circuits, such that the ratio of the number of activations of the first brake circuit and the number of activations of the second brake circuit aims for a fixed ratio.

17 Claims, 4 Drawing Sheets

(56) References Cited

U.S. PATENT DOCUMENTS

| | | | | | |
|---|---|---|---|---|---|
| 4,285,420 | A * | 8/1981 | Sekella | F16D 65/56 | 192/111.1 |
| 4,615,174 | A * | 10/1986 | Nagahara | F15B 13/0422 | 60/468 |
| 4,720,975 | A * | 1/1988 | Gunter | B66D 5/26 | 60/466 |
| 5,014,828 | A * | 5/1991 | Baldassarre | F16D 65/0006 | 188/173 |
| 5,197,284 | A * | 3/1993 | Cartner | F16H 61/4043 | 60/494 |
| 5,228,540 | A * | 7/1993 | Glaser | B66B 5/04 | 187/373 |
| 5,244,060 | A * | 9/1993 | Tanaka | F16D 49/16 | 187/261 |
| 5,255,760 | A * | 10/1993 | Lamb | F16D 66/028 | 188/170 |
| 5,265,701 | A * | 11/1993 | Ogasawara | B66B 1/32 | 188/170 |
| 5,323,878 | A * | 6/1994 | Nakamura | B66B 1/32 | 188/170 |
| 5,353,895 | A * | 10/1994 | Camack | B66B 5/18 | 188/170 |
| 5,648,644 | A * | 7/1997 | Nagel | B66B 5/18 | 187/351 |
| 5,739,610 | A * | 4/1998 | Nemoto | F16D 55/2245 | 310/93 |
| 5,779,325 | A * | 7/1998 | Diesel | B60T 13/683 | 188/170 |
| 6,105,738 | A * | 8/2000 | Christen | B60T 13/686 | 188/170 |
| 6,142,266 | A * | 11/2000 | Appeldorn | B60T 13/743 | 188/72.3 |
| 6,193,026 | B1 * | 2/2001 | Sevilleja | F16D 63/008 | 188/153 R |
| 6,585,088 | B1 * | 7/2003 | Fontaine | F16D 65/186 | 188/170 |
| 7,267,201 | B2 * | 9/2007 | Ito | B66B 5/22 | 187/373 |
| 7,334,403 | B2 * | 2/2008 | Markwart | F16H 61/472 | 60/460 |
| 7,360,630 | B2 * | 4/2008 | Brant | B66B 1/40 | 187/394 |
| 7,591,351 | B2 * | 9/2009 | Fischer | B66D 5/14 | 188/164 |
| 8,091,355 | B2 * | 1/2012 | St. Aubin | E02F 9/2203 | 60/459 |
| 8,863,909 | B2 * | 10/2014 | Dudde | B66B 5/18 | 188/188 |
| 11,939,188 | B2 * | 3/2024 | Hecht | B66B 1/32 | |
| 2002/0117357 | A1 * | 8/2002 | Hugel | B66B 5/22 | 187/373 |
| 2005/0126862 | A1 * | 6/2005 | Ito | B66B 5/185 | 187/350 |
| 2011/0100761 | A1 * | 5/2011 | Dudde | B66B 5/18 | 187/359 |
| 2011/0155523 | A1 * | 6/2011 | Legeret | B66B 5/18 | 188/161 |
| 2013/0081907 | A1 * | 4/2013 | Meierhans | B66B 5/20 | 188/67 |
| 2015/0191328 | A1 * | 7/2015 | Strbuncelj | B66D 5/14 | 187/254 |
| 2016/0152441 | A1 * | 6/2016 | Tschuppert | B66B 5/18 | 303/10 |
| 2016/0221795 | A1 * | 8/2016 | Dudde | B66B 5/18 | |
| 2017/0001841 | A1 * | 1/2017 | Drouet | B66B 13/22 | |
| 2017/0023025 | A1 * | 1/2017 | Hahn | F15B 11/08 | |
| 2017/0029247 | A1 * | 2/2017 | Kuczera | B66B 5/18 | |
| 2017/0029248 | A1 * | 2/2017 | Kuczera | F15B 13/0401 | |
| 2017/0291794 | A1 * | 10/2017 | Bitzi | B66B 1/32 | |
| 2023/0011375 | A1 * | 1/2023 | Hecht | B66B 5/18 | |
| 2024/0067498 | A1 * | 2/2024 | Tang | B66B 5/02 | |

FOREIGN PATENT DOCUMENTS

| | | | | |
|---|---|---|---|---|
| DE | 202014103702 | U1 | 10/2015 | |
| DE | 102014111359 | A1 | 11/2015 | |
| EP | 0648703 | A1 | 4/1995 | |
| EP | 0936174 | A1 | 8/1999 | |
| EP | 1323660 | A1 | 7/2003 | |
| EP | 1840068 | A1 | 10/2007 | |
| EP | 3126276 | B1 | 6/2018 | |
| EP | 3126275 | B1 | 12/2019 | |
| EP | 3250493 | B1 | 10/2020 | |
| EP | 3145847 | B1 | 10/2021 | |
| WO | WO-2014033846 | A1 * | 3/2014 | B66B 5/22 |
| WO | 2016071141 | A1 | 5/2016 | |
| WO | 2016083153 | A1 | 6/2016 | |

* cited by examiner

BRAKE SYSTEM FOR AN ELEVATOR

FIELD

The present invention relates to a brake system, a traveling body component, an elevator system and a method for constructing and operating the brake system.

BACKGROUND

In an elevator system, a traveling body is typically moved vertically along a travel path between different floors or levels within a building. In this case, at least in tall buildings, an elevator type is usually used in which the traveling body is held by cable-like or belt-like suspension elements and displaced within an elevator shaft by moving the suspension elements by means of a drive machine. Alternatively, a suspension element can also be designed as a direct drive of the car, for example by a friction wheel on a rail or by a linear drive. In order to at least partially compensate for the load of the traveling body to be moved by the drive machine, a counterweight is usually fastened to an opposite end of the suspension element. In order to be able to hold the traveling body at a floor without keeping the drive activated, or in order to hold the traveling body, if the drive or the suspension element fail, the elevator system has a brake system.

DE10 2014 111 359 A1 shows that an elevator car braking unit is provided with at least one, preferably a plurality of, hydraulic actuator(s), and that it is arranged on the car, that is to say an elevator car.

Such brake systems have a limited service life. In particular, the brake pads become worn during operation. However, the brake system is usually designed such that the failure of one brake does not result in failure of the complete brake system. The failure of a brake pad should therefore not lead to the traveling body plummeting in free fall. Since the brakes brake less well, the braking distance becomes longer. The longer braking distance causes more potential energy to be released at the traveling body. As a result, the remaining brakes must absorb more energy. However, since, when the end of the service life of a brake pad of one brake is reached, the end of the service life of the brake pads of the other brakes is also almost reached, these are no longer able to absorb the additional energy. There is then the risk that the failure of a single brake pad results in the failure of the other brake pads in an emergency situation. Thus, the brakes would no longer reliably stop and hold the traveling body. Such a brake system would therefore no longer secure the elevator system and the passengers thereof reliably against the traveling body plummeting.

SUMMARY

An object of the invention can therefore be considered that of making such a brake system more reliable.

According to a first aspect of the invention, the object is achieved by a brake system for an elevator system. The brake system comprises a first brake circuit, a second brake circuit and a control unit. The first brake circuit and the second brake circuit each comprise a brake, and each brake comprises an actuator and a main spring unit. The actuator is pretensioned by the main spring unit in the closing direction of the brake with the force required for the application of the braking force, and the actuator compensates, activated by a control signal of the control unit, the force of the main spring unit and the actuator thus releases the brake. The control unit generates a first control signal for the first brake circuit and a second control signal for the second brake circuit, the control unit activating neither of the two control signals, only the first of the two control signals, only the second of the two control signals, or both control signals. During activation, the control unit selects only one of the two control signals between the activation of the first control signal and the activation of the second control signal such that the ratio of the number of activations of the first brake circuit and the number of activations of the second brake circuit aims for a fixed ratio.

According to a second aspect of the invention, the object is achieved by a traveling body component comprising a brake system according to the first aspect of the invention. The first brake circuit, the second brake circuit, and the control unit are fastened to the traveling body component for transport.

According to a third aspect of the invention, the object is achieved by a traveling body comprising a brake system according to the first aspect of the invention or comprising a traveling body component according to the second aspect of the invention. The first brake circuit comprises a first brake and a second brake, and the first brake and the second brake are attached to the opposite sides of the traveling body; in particular, the second brake circuit comprises a third brake and a fourth brake, and the third brake and the fourth brake are attached to opposite sides of the traveling body.

According to a fourth aspect of the invention, the object is achieved by an elevator system comprising a brake system according to the first aspect of the invention or a traveling body according to the third aspect of the invention. The elevator system has at least a first and a second rail system, in each case one of the two brakes of a brake circuit braking on the first rail system, and the other of the two brakes, respectively, of the same brake circuit braking on the second rail system.

According to a fifth aspect of the invention, the object is achieved by a method for constructing a traveling body according to the fourth aspect of the invention. The method for constructing a traveling body comprising a brake system includes the steps of:

- attaching the first brake circuit and the associated brakes and the second brake circuit and the associated brakes and the control unit to a traveling body component,
- assembling the traveling body component with further components of the traveling body to form an at least partially mounted traveling body,
- converting the braking of the traveling body component to one of the further components of the traveling body.

According to a sixth aspect of the invention, the object is achieved by a method for operating a brake system according to the first aspect of the invention. The method for operating a brake system comprises the steps of:

- receiving or generating a command for activating only one brake circuit, by the control unit,
- selecting the brake circuit to be activated,
- activating the selected brake circuit.

Possible features and advantages of embodiments of the invention can be considered, inter alia and without limiting the invention, to be based upon the concepts and findings described below.

A brake system can serve to catch a traveling body, i.e., if an overspeed of the traveling body is detected, the brake system brakes with an acceptable deceleration until stationary, and the brake system then reliably holds the traveling body in this position. A deceleration can be regarded as acceptable if the occurring accelerations remain so small that no persons are injured, nor is the elevator system damaged. A further function of the brake system can be to reliably stop the traveling body at a floor, after reaching the floor, and to hold it there. In this case, the traveling body is first stopped by the drive at the correct position. The traveling body is substantially stationary there. At least some of the brakes of the brake system are then activated and hold the traveling body in this position, so that the drive can be switched off. Furthermore, the brake system can also serve to decelerate when arriving at a floor.

The brake system comprises a plurality of brake circuits which have at least a first and a second brake. In this case, the brake comprises a main spring unit. The main spring unit can be designed as a steel spring or as a gas pressure cylinder. Combinations of a plurality of steel springs and/or gas pressure cylinders can also form the main spring unit. The main spring unit serves to bias the brake in the direction of a closing direction in such a way that a sufficiently large braking force results, in order that the brake can brake according to its requirements. The actuator serves to open the brake against the force of the main spring unit.

The brake system is activated in the majority of cases in order to hold the traveling body at a floor. This activation of the brake system takes place during each journey of the elevator system.

The control unit is able to receive a command to activate the brakes. Such a command can, for example, reach the control unit via a bus system. Such a command can contain the instruction to activate one brake circuit, two brake circuits or all brake circuits. For receiving and processing of the command, the control unit preferably has a microprocessor. Alternatively, however, the control unit can also generate such a command itself. For this purpose, the control unit can evaluate further system data of the elevator system, for example. This can be, for example, a speed or acceleration of the traveling body, a state of the safety circuit, or a load measurement in the traveling body. This therefore means that the signals of further sensors can be processed on the microprocessor of the control unit. A result of such processing could also be a command for activating the brakes, and in particular a single brake circuit.

The control unit processes the command and decides which of the brake circuits are activated. In the form of the control signals, the control unit has the possibility of selectively controlling the brakes of the individual brake circuits. For example, the control signal can be the drop of an electrical voltage on a cable which connects a brake circuit, the drop in the voltage being able to deactivate the actuators, designed as solenoids, and the brakes of this brake circuit thus closing. Alternatively, the control signal can also be an electrical voltage which controls electromagnetic valves of a hydraulic system, as a result of which the pressure can be discharged from a hydraulic circuit, and the brakes thus close. Preferably, the control unit is defined such that the control of the valves is still regarded as an internal function of the control unit. The control signal transferred to the brake circuit is then the pressure of the hydraulic fluid in the brake circuit. The brakes are released by a pressure increase in the hydraulic lines of a brake circuit. The brakes are closed again as a result of the drop in pressure.

The control unit typically receives the command to release all brake circuits before travel. The traveling body is then moved.

During travel, emergency stop situations, such as a power failure or a detection of failure of an important sensor, may occur. Power failures in particular can occur very frequently in certain regions, as a result of which this emergency stop situation of the power failure can also be very frequent. The tearing of a suspension element can also be such an emergency stop situation. At least in a first phase, it may be advantageous to brake with only one brake circuit, in order to keep the decelerations low. Even if the traveling body is to be held only briefly for a stop at a floor, it can be advantageous to close only one of the brake circuits.

If an emergency stop situation now occurs during the journey, or the traveling body is to be held only briefly at a floor, the control unit receives a command from the elevator controller, which has detected the emergency stop situation, to brake using one of the brake circuits. Braking using only one brake circuit is advantageous in order to limit the deceleration. If, in these cases, braking is always carried out using the same brake circuit, this would wear very quickly. It is therefore advantageous to brake now and again using one of the other brake circuits. Therefore, the control unit selects a brake circuit in the cases when it could activate more brake circuits than is currently necessary. For this purpose, the control unit has a decision algorithm which makes this selection.

It is advantageous to have a plurality of brake circuits, but only to activate a single one of the brake circuits in each case, during stopping at the floor, and to protect the other brake circuits. When using two brake circuits, the service life of the brake pads is approximately doubled. A brake system can in particular also comprise more than two brake circuits.

The brakes of the individual brake circuits are each controlled by a control signal of the control unit. The origin of the control signal therefore lies in the control unit. Preferably, this control signal contains sufficient energy, i.e., the ability to perform work, in order to supply the actuator with sufficient energy to overcome the preload force of the main spring unit. The control signal can therefore be a pressure increase in a hydraulic line, which moves a hydraulic actuator against the preload force of the main spring unit. The control signal can alternatively be an electrical power supply which supplies an electromagnet with current so that it moves against the preload force of the main spring unit.

However, it has now been recognized that, in the case of a uniform distribution of the activations over both brake circuits, both brakes reach the end of their life approximately at the same time. This entails the risk that at this time the brake system may no longer be able to brake sufficient strongly if an emergency stop situation occurs, which makes it necessary to apply large braking forces and absorb large braking energies.

It is therefore proposed to control the selection of the brakes such that the brakes of the first brake circuit age more quickly than the brakes of the second brake circuit. Thus, in an emergency stop situation, even if the brakes of the first brake circuit are close to the end of their life, the brakes of the second brake circuit are still sufficiently far from the end of their life. As a result, the brake system is better protected against plummeting.

The traveling body component can be designed in the form of a roof element of the elevator car. In this case, the control unit is already premounted on the traveling body component. The brakes are also already fastened to this traveling body component, even if this position does not correspond to the final position in the elevator system. In particular in the case of a hydraulic brake, it is advantageous in this case that all connections to the brakes are already rigidly connected to one another at the factory. This allows the connections to be designed to be permanently leak-free. The brakes are then only repositioned during the mounting of the traveling body. In particular, the hydraulic lines are designed to be bendable for this purpose. The advantage is that the assembly of the brake system in the factory is carried out by a specialist. Then only the brakes have to be repositioned on the construction site. This increases the quality of the assembly. Nevertheless, the brake can easily be transported together with the other parts, as part of the traveling body component.

At the construction site, the traveling body component can then be assembled together with other components to form a traveling body. During assembly, the brakes, which were fastened to the traveling body component during transport, can be displaced laterally on the traveling body at one location. In particular when using hydraulic brakes, the hoses are designed in this case so as to be flexible, such that they can be arranged on the construction site without opening the liquid-conducting components.

Typically, a traveling body is guided through two rail systems which also serve as brake rails. A single rail system designates here a single strand, which preferably has rail elements which are arranged in a row. These rail systems run on opposite sides of the traveling body. The brakes are attached to opposite sides of the traveling body, so that they are brought into engagement with the rail systems and can brake on the rail systems.

The method for operating the brake system responds to the receiving or generation of a command for activation. Such a command can be received for example via a bus system for data communication. However, the brake system can also have sensors, such as speed sensors and/or acceleration sensors, which allow the brake system to decide when activation is appropriate. In this case, the command includes the information of whether only one brake circuit or a plurality of brake circuits are activated. In the event that only one brake circuit or a subgroup of all available brake circuits is to be activated, the brake system selects which of the available brake circuits is/are selected. This brake circuit is then selected so that the ratio of the number of activations of the first brake circuit and the number of activations of the second brake circuit aims for a fixed ratio.

According to a preferred embodiment of the brake system, the brake system, and in particular the control unit, has a memory system which stores at least one state variable, which, when only one brake circuit of the brake system is activated, is transferred as a parameter to a decision algorithm, which makes the selection of the control signal to be activated.

Depending on which of the following methods is used, however, the unit preferably stores at least one basis for a random number or a position in a sequence, and the sequence. The memory unit preferably also stores further data, such as the executable code of the decision algorithm.

According to a further embodiment of the method for operating a brake system, the selection of the brake circuit to be activated comprises the steps of:

generating a random number, selecting the brake circuit to be activated on the basis of the random number, the probability for activation of a brake circuit being selected such that the defined ratio results.

In this case, the generation of a random number preferably involves the transfer of an initial value from a call of the random generator to the next call of the random generator. This can be stored in the memory system.

A random number between, for example, 0 and 1 can therefore be generated. If the random number is smaller than a certain value, then the first brake circuit is activated. Otherwise, the second brake circuit is activated.

According to a preferred embodiment of the method for operating a brake system, the selection of the brake circuit to be activated comprises the steps of:

determining a sequence of individual activations of the first or second brake circuit, the sequence including the activations of the first or second brake circuit in the defined ratio, determining an indicator for a position in the sequence, selecting the brake circuit to be activated from the sequence, based on the indicator, setting the indicator to the next position in the sequence, or setting the indicator to the first position in the sequence if the indicator is set to the last position of the sequence.

Thus, if, for example, a defined ratio of 1.5 for the ratio of the number of activations of the first brake circuit and the number of activations of the second brake circuit should be sought, then this can be achieved by a sequence which activates the first brake circuit three times in each case, and then activates the second brake circuit twice, and then starts again from the beginning. For this purpose, the position in the sequence at which the braking system, i.e., the decision algorithm, is located, is stored in the memory system. This value is reset to one after each activation, and is set back to the beginning after the sequence has been completed.

According to a preferred embodiment of the method for operating a brake system, the method further comprises one or more of the following steps:

catching a traveling body by the brake system in response to the detection of an overspeed of the traveling body, holding the traveling body at a floor when the drive is switched off, braking and secure holding of the traveling body in an emergency stop situation, in particular in the case of emergency stop situations due to a power failure, opening of a shaft door during travel, or detection of incorrect measurement signals.

A brake system can serve to catch a traveling body, i.e., if an overspeed of the traveling body is detected, the brake system brakes with an acceptable deceleration until stationary, and the brake system then reliably holds the traveling body in this position. Preferably, only one brake circuit is activated for this purpose, in order to keep the decelerations low. Only after stopping are all brake circuits closed. This is advantageous because holding the brakes open typically consumes energy.

A further function of the brake system can be to securely stop the traveling body at a floor after reaching the floor, and to hold it there. Preferably, only one brake circuit is activated for this purpose. Only in the case of longer holding at a floor is it advantageous to close the brakes of all brake circuits, in order to save energy.

A brake system can serve to brake and hold a traveling body in an emergency stop situation. Preferably, only one brake circuit is activated for this purpose, in order to keep the decelerations low. Only after stopping are all brake circuits closed. This is advantageous because holding the brakes open typically consumes energy.

According to a preferred embodiment of the brake system, the actuator is designed as a hydraulic cylinder, and a flow of a hydraulic fluid acts as a control signal.

In other words, the actuators are therefore designed as hydraulic cylinders in the brakes. By applying a pressure to the hydraulic line, which connects the control unit to the brake, a piston is moved in the housing of the brake. The movement acts against the main spring unit and thereby opens the brake.

According to a preferred embodiment of the brake system, the hydraulic cylinder has a piston, the piston being actuated only from one side by the hydraulic fluid.

This has the advantage that only one hydraulic line must be guided to a brake. This is more favorable in the manufacture and assembly.

According to a preferred embodiment of the brake system, each of the brakes has a plurality of hydraulic cylinders, each having a separate piston in a common housing.

This plurality of pistons can transmit the force more uniformly to the brake pad. In addition, a plurality of smaller cylinders and pistons are more economical to manufacture than a large piston.

According to a preferred embodiment of the brake system, a brake circuit comprises two brakes.

It is advantageous here that at least one first brake and one second brake of one, the first or the second, brake circuit are arranged on opposite sides of the traveling body. The resulting force, which is generated thereby during activation of a brake circuit, acts closer to the center of gravity of the elevator car than if all brakes of a brake circuit were to act on the same side of the elevator car.

According to a preferred embodiment of the brake system, the fixed ratio is between 20 to 1 and 1.01 to 1, preferably between 9 to 1 and 1.1 to 1, particularly preferably between 6 to 1 and 2.5 to 1, and most preferably the ratio is 4 to 1.

It is advantageous for one brake circuit to be activated slightly more frequently than the other, since it is thereby possible to detect the intended service life on the more frequently activated brake circuit being reached, while the other brake circuit still has safety reserves, since it has been activated less often. Optimally, in this case, a brake, i.e., its brake shoe, is activated 4 times more frequently than the other brake, i.e., its brake shoe. As a result, the less frequently activated brake shoe has reached approximately 25% (=¼) of its service life. In this situation, it is still sufficiently safe to be able to also assume very large loads. Depending on the requirements for safety, and the choice of material of the brake pads, other ratios in the ranges specified above can also prove advantageous.

Further advantages, features and details of the invention can be found in the following description of exemplary embodiments and with reference to the drawings, in which like or functionally like elements are provided with identical reference signs. The drawings are merely schematic and are not to scale.

DETAILED DESCRIPTION

Figure 1:
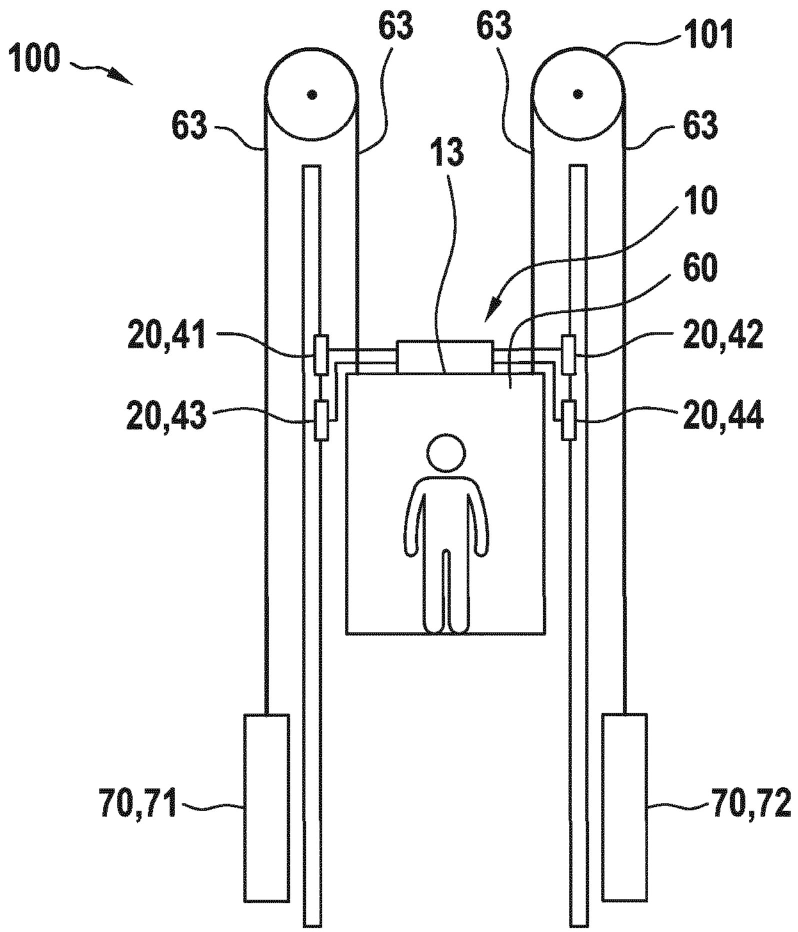
FIG. 1 shows an elevator system comprising the brake system.

FIG. 1 shows an elevator system 100 comprising a brake system 10. The elevator system 100 has a drive 101 and a traveling body 60 which is suspended on suspension elements 63 opposite counterweights 62. The traveling body 60 has a brake system 10. The brake system 10 has a control unit 13 and a total of four brakes 20. In this case, a first brake 41 is arranged on a first brake circuit 11 (FIG. 2) and a second brake 42 is arranged on the first brake circuit 11. In addition, a third brake 43 is arranged on a second brake circuit 12 (FIG. 2) and a fourth brake 44 is arranged on the second brake circuit 12. In this case, all the brakes 20 act on a rail system 70. The brakes 41, 43 of a brake circuit each act on the first rail system 71. The brakes 42, 44 of a brake circuit each act on the second rail system 72. The brake system 10 can be designed hydraulically.

Figure 2:
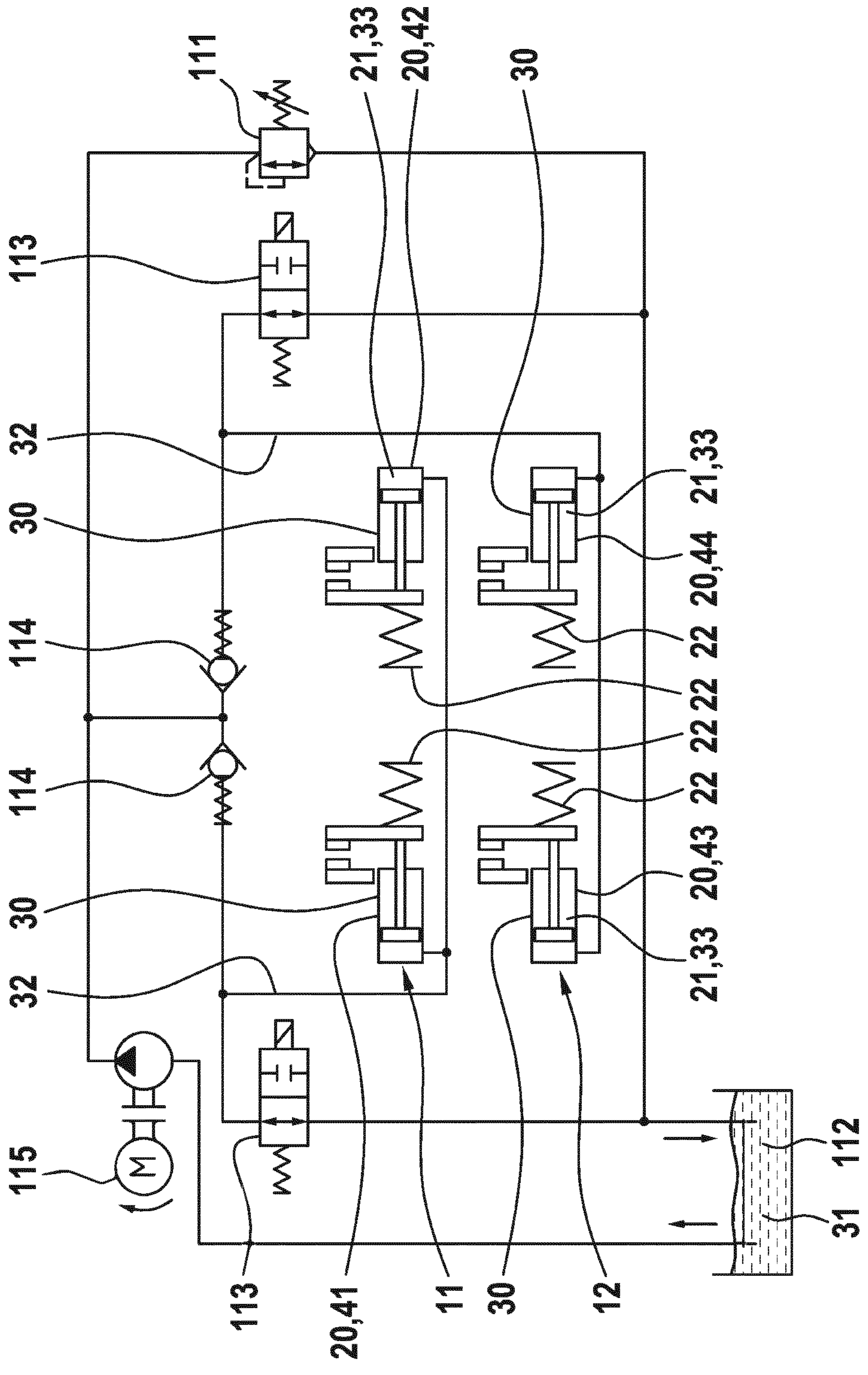
FIG. 2 shows a hydraulic switching diagram of the brake system.

FIG. 2 shows a diagram of a hydraulic brake system as shown in FIG. 1.

In addition to the electronic and electrical components (not shown), the control unit 13 has a tank 112, a pump 115, two check valves 114 and two electromagnetic valves 113 and an overpressure valve 111. The two hydraulic lines 32 connect the control unit to the brakes 20, that is, 41, 42, 43 and 44.

The pump 115 continuously pumps the hydraulic fluid 31. Both brake circuits 11 and 12 are supplied with hydraulic fluid 31 via a respective check valve 114. In order to keep the brake closed, the electromagnetic valve 113 of the corresponding brake circuit 11 or 12 can discharge the hydraulic fluid 31 directly into a tank 112. As a result, no pressure builds up in the brake circuits 11 or 12, and the brakes 20 remain closed. In order to close the electromagnetic valve 113, a voltage must be applied to the electromagnetic valve 113. As a result, the electromagnetic valve 113 closes and a hydraulic pressure builds up in the corresponding brake circuit, which opens the brake 20. In this case, the hydraulic fluid presses on a piston 33 in a cylinder 30 as the actuator 21. Each of the brakes 20 can have two or more of the cylinder 30 and the piston 33 to transmit the force more uniformly to the brake pad. The build-up of pressure causes the brake 20 to be released and the brake to be held released against the main spring unit 22. An overpressure valve 111 ensures that a maximum permissible pressure in the hydraulic lines 32 is not exceeded even if both electromagnetic valves 113 are set such that no hydraulic fluid 31 is discharged into the tank 112. In this case, the hydraulic fluid 31 flows off into the tank 112 via the safety valve 111.

Figure 3:
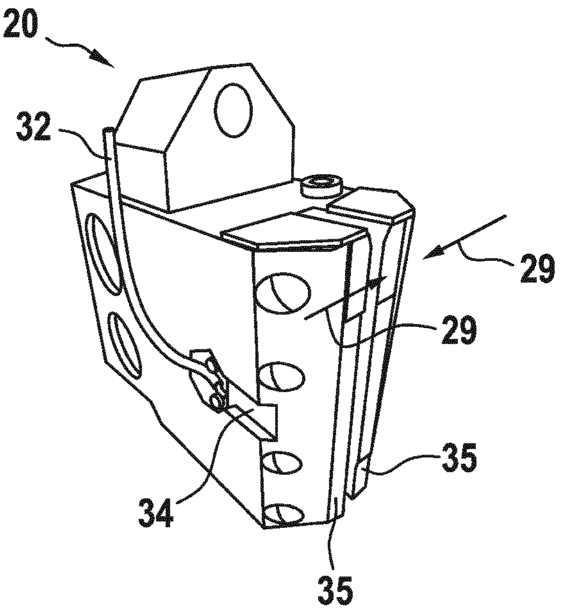
FIG. 3 shows a brake.

One of the brakes 20 is shown in FIG. 3. The brake pads 35 close in the closing direction 29, and thereby press on parts of the rail systems (not shown here). The brake 20 has a housing 34 in which the cylinder 30 (FIG. 2) is disposed.

During travel, the electromagnetic valves 113 are closed, so that the hydraulic fluid 31 releases the brakes 20. After the receiving or generation of a command for activating only one brake circuit 11 or 12, the decision algorithm selects a brake circuit 11 or 12. The first brake circuit 11 is selected here, as an example. The electromagnetic valve 113 is now opened at the first brake circuit 11, and the pressure escapes from the first brake circuit 11. The brakes 41 and 42 close and start braking. The pressure in the second brake circuit 12 is maintained due to the check valve 114, and the brakes 43 and 44 therefore remain in a released state.

Figure 4:
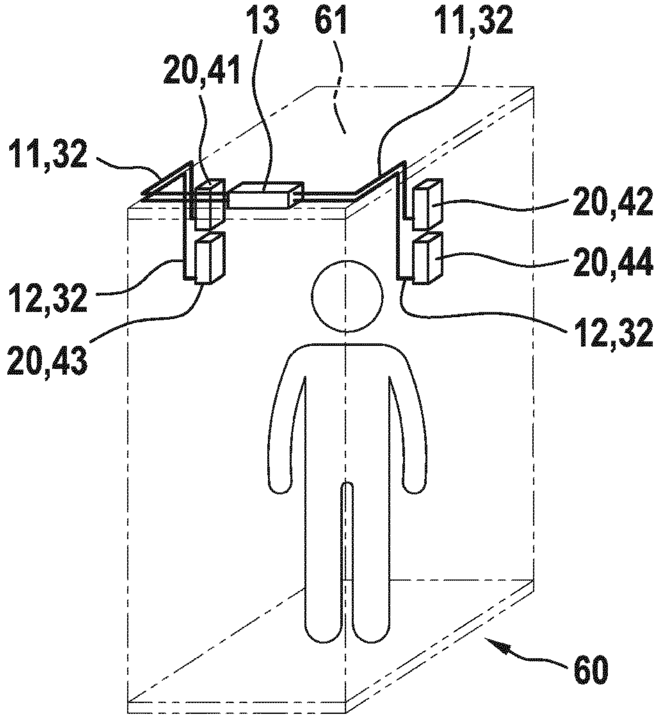
FIG. 4 shows a brake system on a traveling body.

FIG. 4 shows the traveling body 60 of the elevator system from FIG. 1. The hydraulic lines 32 connect the control unit 13 to the brakes 20. In this case, separate hydraulic lines 32 extend for the first brake circuit 11 and the second brake circuit 12.

As in the previous figures, a first brake 41 is arranged on the first brake circuit 11 and a second brake 42 is arranged on the first brake circuit 11. In addition, a first brake (third brake 43) is arranged on the second brake circuit 12 and a second brake (fourth brake 44) is arranged on the second brake circuit 12.

Figure 5:
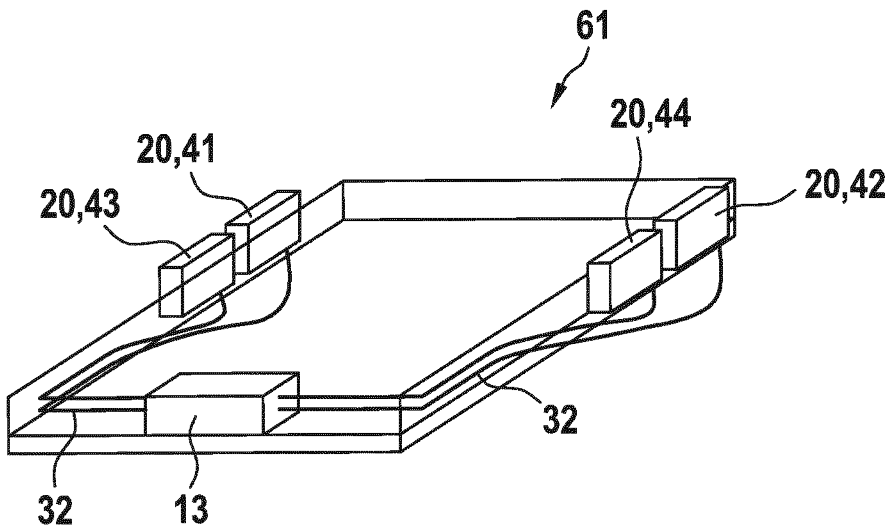
FIG. 5 shows a traveling body component.

A traveling body component 61 is formed as a roof. FIG. 5 shows the traveling body component 61 as it is delivered to the construction site. The control unit 13, the hydraulic lines 32 and the brakes 20 are fastened to the traveling body component 61. A roof element, as shown in FIG. 4 and FIG. 5, is particularly well suited as a traveling body component 61 in order to reliably transport the brake system 10 to the construction site. At the construction site, the roof is then assembled with the other components of the traveling body 60, and the brakes 20 are moved from their transport position on the traveling body component 61 into their use position. The use positions are preferably arranged laterally next to the traveling body 60, preferably on opposite sides of the traveling body.

Figure 6:
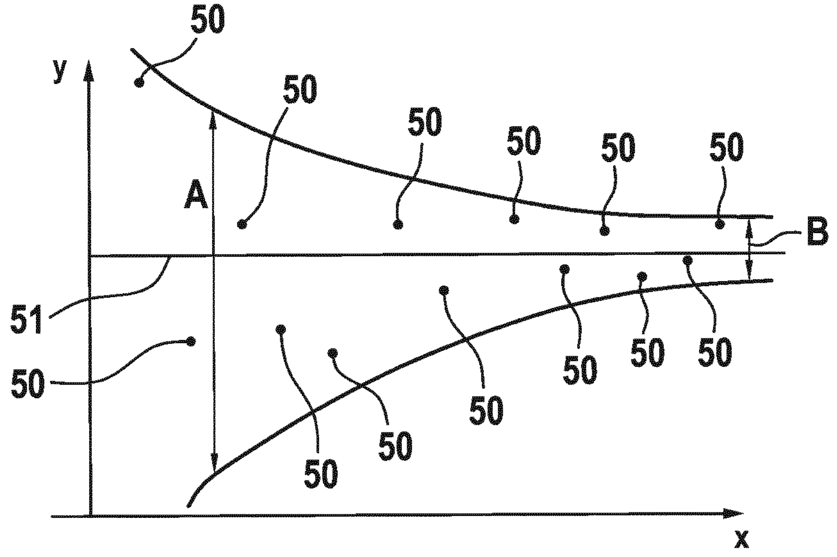
FIG. 6 shows a profile of aiming at a ratio.

FIG. 6 shows a profile of the ratios of the number of activations of the first brake circuit 11 and the number of activations of the second brake circuit 12, which aims for a fixed ratio. In this case, the value of the ratio is plotted on the y-axis. The x-axis extends over the number of overall activations. As the number of activations increases, the ratio 50 always aims closer to a fixed ratio 51 to be sought. At the beginning, the deviations A from the ratio 51 to be sought can still be large. As the number of activations x increases, these deviations become increasingly smaller B.

Finally, it should be noted that terms such as "having," "comprising," etc. do not preclude other elements or steps, and terms such as "a" or "one" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A brake system for an elevator system, the brake system comprising:

a first brake circuit;

a second brake circuit;

a control unit being connected to the first brake circuit and to the second brake circuit;

the first brake circuit and second brake circuit each including a brake, each of the brakes having an actuator and a main spring unit, the actuator being preloaded by the main spring unit in a closing direction of the brake with a force required for application of a braking force by the brake, and the actuator being activated by a control signal from the control unit, the control signal compensating the preloaded force of the main spring unit, and thereby releasing the brake;

the control unit generating the control signal as a first control signal for the first brake circuit and a second control signal for the second brake circuit, the control unit selectively generating neither of the first and second control signals, only the first control signal, only the second control signal, and both of the first and second control signals; and wherein the control unit, when generating only the first control signal or only the second control signal, selects between the first control signal and the second control signal such that a ratio of a number of activations of the first brake circuit and the number of activations of the second brake circuit aims for a predetermined fixed ratio.

2. The brake system according to claim 1 wherein the control unit stores at least one state variable, which, upon activation of only one of the first and second brake circuits, is transferred as a parameter to a decision algorithm that makes the selection of the control signal to be generated.

3. The brake system according to claim 1 wherein each of the first and second brake circuits has two of the brake.

4. The brake system according to claim 1 wherein the fixed ratio is one of between 20 to 1 and 1.01 to 1, between 9 to 1 and 1.1 to 1, between 6 to 1 and 2.5 to 1, and 4 to 1.

5. The brake system according to claim 1 wherein the actuator is a hydraulic cylinder and a flow of a hydraulic fluid to the hydraulic cylinder is the control signal.

6. The brake system according to claim 5 wherein the hydraulic cylinder has a piston actuated only from one side thereof by the hydraulic fluid.

7. The brake system according to claim 6 wherein each of the brakes has a plurality of hydraulic cylinders, each of the hydraulic cylinders having a separate piston, and each of the pluralities of hydraulic cylinders is in an associated common housing.

8. A traveling body component comprising the brake system according to claim 1 wherein the first brake circuit, the second brake circuit, and the control unit are fastened to the traveling body component prior to transport to a construction site.

9. A traveling body comprising:

the brake system according to claim 1;

wherein the brake of the first brake circuit is a first brake and the first brake circuit includes a second brake, the first brake and the second brake being attached on opposite sides of the traveling body; and wherein the brake of the second brake circuit is a third brake and the second brake circuit includes a fourth brake, the third brake and the fourth brake being attached on the opposite sides of the traveling body.

10. An elevator system comprising:

a traveling body;

a brake system according to claim 1 attached to the traveling body, the first brake circuit having two of the brake;

a first rail system and a second rail system along which rail systems the traveling body is movable; and wherein one of the two brakes of the first brake circuit is adapted to brake on the first rail system and another of the two brakes of the first brake circuit is adapted to brake on the second rail system.

11. The elevator system according to claim 10 wherein the second brake circuit has two of the brake, and wherein one of the two brakes of the second brake circuit is adapted to brake on the first rail system and another of the two brakes of the second brake circuit is adapted to brake on the second rail system.

12. A method for constructing a traveling body including the brake system according to claim 1, the method comprising the steps of:

attaching the first brake circuit, the second brake circuit and the control unit to a traveling body component;

assembling the traveling body component together with further components of the traveling body to form an at least partially mounted traveling body; and converting a braking from the traveling body component to one of the further components of the traveling body.

13. A method for operating the brake system according to claim 1, the method comprising the steps of:

receiving or generating a command for activating only one of the first and second brake circuits by the control unit;

selecting the one of the brake circuits to be activated; and activating the selected brake circuit.

14. The method according to claim 13 wherein the selection of the brake circuit to be activated comprises the steps of:

generating a random number; and selecting the brake circuit to be activated based on the random number, a probability for activation of one of the brake circuits being selected such that the fixed ratio results.

15. The method according to claim 13 wherein the selection of the brake circuit to be activated comprises the steps of:

determining a sequence of individual activations of the first brake circuit or the second brake circuit, the sequence including the activations in the fixed ratio;

determining an indicator for a position in the sequence;

selecting one of the brake circuits to be activated from the sequence based on the indicator; and setting the indicator to a next position in the sequence, or setting the indicator to a first position in the sequence when the indicator is set to a last position of the sequence.

16. The method according to claim 13 further comprising at least one of the steps of:

catching a traveling body by the brake system in response to a detection of an overspeed of the traveling body;

holding the traveling body at a floor when a drive moving the traveling body is switched off; and braking to hold the traveling body in an emergency stop situation.

17. The method according to claim 16 wherein the emergency stop situation is due to at least one of a power failure, opening of a shaft door during travel, or detection of incorrect measurement signals.

* * * * *